(12) United States Patent
Kohori

(10) Patent No.: US 6,592,313 B2
(45) Date of Patent: Jul. 15, 2003

(54) PULL STUD BOLT

(75) Inventor: Yoshinori Kohori, Hirata (JP)

(73) Assignee: JK Kabushiki Kaisha, Hirata (JP)

( * ) Notice: Subject to any disclaimer, the term of this patent is extended or adjusted under 35 U.S.C. 154(b) by 0 days.

(21) Appl. No.: 09/757,488

(22) Filed: Jan. 11, 2001

(65) Prior Publication Data
US 2001/0028836 A1 Oct. 11, 2001

(30) Foreign Application Priority Data
Apr. 11, 2000 (JP) ........................................ 2000-002330

(51) Int. Cl.⁷ .......................... F16B 23/00; F16B 35/06
(52) U.S. Cl. ..................... 411/402; 411/401; 411/919; 285/316
(58) Field of Search ................................ 411/388, 401, 411/402, 917, 919; 285/256, 322, 316

(56) References Cited

U.S. PATENT DOCUMENTS

| 2,744,770 A | * | 5/1956 | Davidson et al. ........... 285/316 |
| 4,313,629 A | * | 2/1982 | Winterhalter ............... 285/256 |
| 4,544,187 A | * | 10/1985 | Smith ......................... 285/256 |
| 4,991,876 A | * | 2/1991 | Mulvey .................. 285/256 X |
| 5,290,009 A | * | 3/1994 | Heilmann ............... 285/316 X |
| 5,605,423 A | * | 2/1997 | Janusz .................... 411/401 X |
| 6,102,642 A | * | 8/2000 | Kawashita et al. ......... 411/401 |

* cited by examiner

Primary Examiner—Neill Wilson
(74) Attorney, Agent, or Firm—Armstrong, Westerman & Hattori, LLP

(57) ABSTRACT

A pull stud bolt has two pairs of wrench engaging faces formed on a flange thereof. The adjacent wrench engaging faces make an angle of 90 deg with each other. Alternatively, three pairs of wrench engaging faces are formed on the flange. The adjacent wrench engaging faces make an angle of 120 deg with each other.

2 Claims, 3 Drawing Sheets

PULL STUD BOLT

BACKGROUND OF THE INVENTION

The present invention relates to pulls stud bolts, which are used in, for example, metal-working machinery.

Pull studs and pull stud bolts are disclosed in U.S. Pat. Nos. 5,946,789; 5,885,039; 5,846,037; 5,823,722; 5,762,454; 5,735,651; 5,700,115; 5,690,137; 5,662,422; 5,660,510; 5,640,749; 5,639,194; 5,623,730; 5,593,258; 5,539,970; 5,538,379; 5,407,308; 4,977,799; 4,541,533; and others.

Conventional pull stud bolts comprise a male screw portion toward one end, a grip porion toward the other end and a flange portion formed between the two portions. The flange portion has a pair of wrench engaging faces.

When the pull stud bolt is to be tightened up on a shank or loosened from the shank, a wrench is first fitted to the wrench engaging faces of the stud bolt with its handle down. The wrench is then turned through 180 deg to position the handle up. The wrench is thereafter released from the wrench engaging faces. The pull stud bolt is tightened up on the stud bolt or loosened by repeating this procedure.

Thus, the conventional pull stud bolt must be handled by turning the wrench through 180 deg and therefore has the problem of necessitating turning of the wrench through a large angle, for example, for tightening up the stud bolt, hence difficult work.

SUMMARY OF THE INVENTION

An object of the present invention is to provide a pull stud bolt which can be handled easily by turning a wrench through a reduced angle, for example, for tightening up.

The present invention provides a pull stud bolt which comprises a flange having two pairs of wrench engaging faces, the adjacent wrench engaging faces making an angle of 90 deg with each other.

The pull stud bolt has a flange provided with two pairs of wrench engaging faces, and the adjacent wrench engaging faces make an angle of 90 deg with each other, so that for example when the pull stud bolt is tightened up by repeating the sequential actions of rotating the stud bolt by a wrench, then removing the wrench from the flange and engaging the wrench with the flange again, the wrench is turned through 90 deg at a time.

The present invention provides another pull stud bolt which comprises a flange having three pairs of wrench engaging faces, the adjacent wrench engaging faces making an angle of 120 deg with each other.

In the case of this pull stud bolt, the wrench is turned through 60 deg at a time, for example, when the pull stud bolt is tightened up by repeating the sequential actions of releasing the wrench from the flange and engaging the wrench with the flange again.

Thus, the pull stud bolt of the present invention assures easy work since the stud bolt can be handled by turning the wrench through one-half or one-third the angle conventionally needed.

DESCRIPTION OF THE PREFERRED EMBODIMENTS

Embodiments of pull stud bolt of the present invention will be described below with reference to the drawings.

The pull stud bolt of the first embodiment of the invention will be described first with reference to FIGS. 1 and 2. The terms "front" and "rear" are used in the following description based on the state in which the wrench is engaged with the pull stud bolt with its handle positioned horizontally, and the term "front" refers to the open end side of the wrench in this state.

Figure 1:
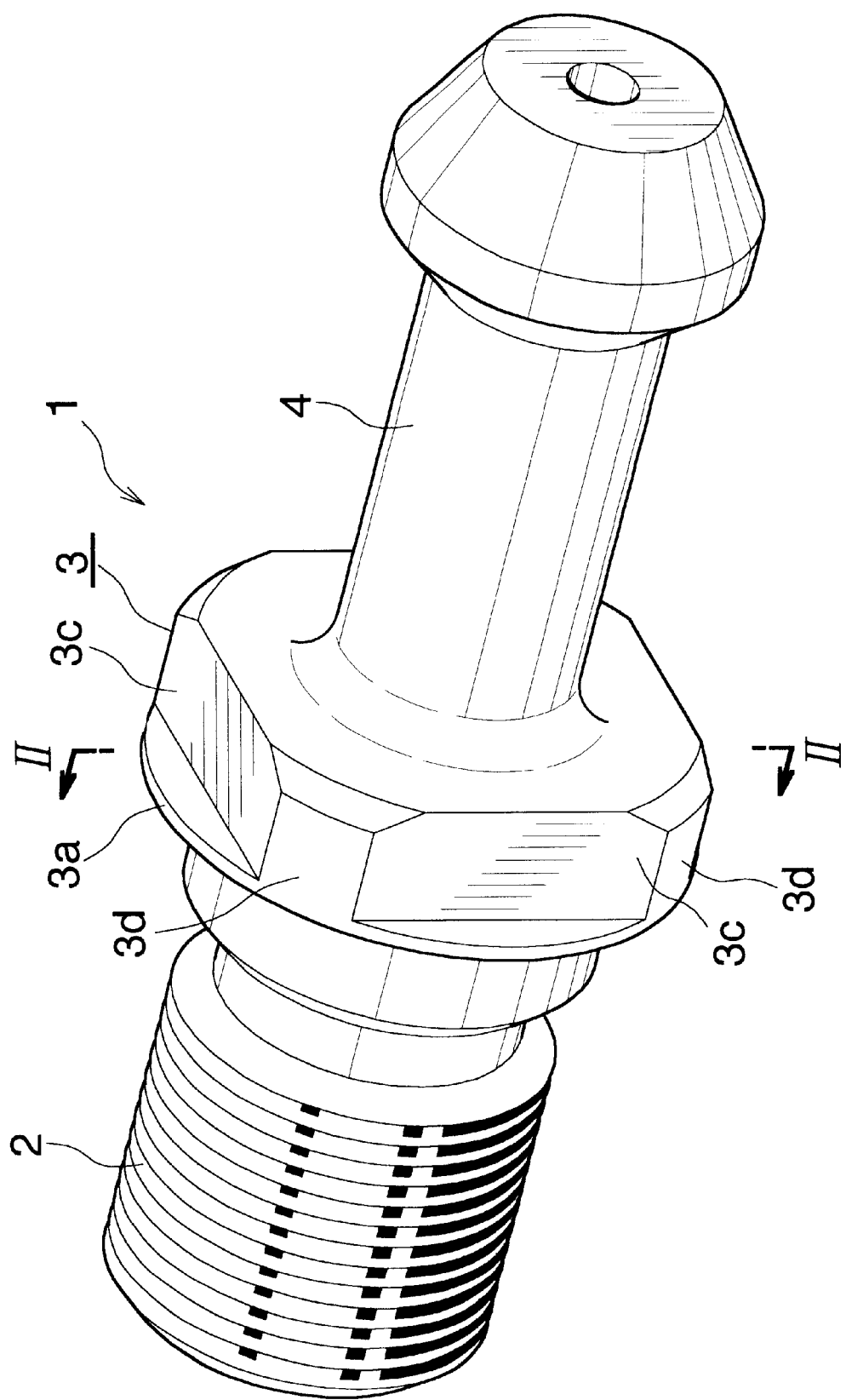
FIG. 1 is a perspective view generally showing a pull stud bolt as a first embodiment of the invention.

FIG. 1 shows a pull stud bolt 1 which comprises a screw portion 2 at one end to be screwed, for example, into a female screw portion of a shank, a grip portion 4 at the other end, and a flange portion 3 between the two portions 2, 4.

The pull stud bolt 1 has the same construction as the conventional pull stud bolt except for the flange portion 3. Further the pull stud bolt 1 as attached to the shank is mounted on a machining center by the same procedure as the conventional one.

The flange portion 3 will be described below in detail.

Figure 2:
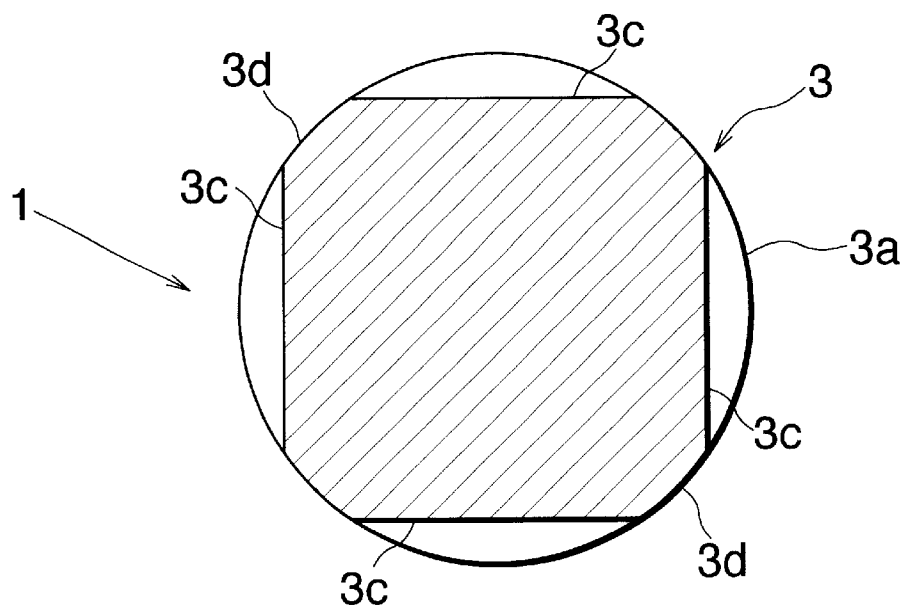
FIG. 2 is a view in section taken along the line II—II in FIG. 1.

The flange portion 3 has a circular part 3a toward the screw portion 2, and two pairs of wrench engaging faces 3c formed on the other part of the portion 3 toward the grip portion 4 and positioned at opposite sides of circular-arc parts 3d flush with the periphery of the circular part 3a As shown in FIG. 2, the adjacent wrench engaging faces 3c make an angle of 90 deg with each other.

The pull stud bolt 1 is handled, e.g., tightened up on a shank, by the procedure to be described below.

For example, a wrench is first fitted to the wrench engaging faces 3c of the pull stud bolt 1 with its handle positioned horizontally. The wrench is then turned through 90 deg to position the handle up. The wrench with its handle up is then released from the wrench engaging faces 3c. The pull stud bolt 1 is tightened up by repeating this procedure.

Next, a pull stud bolt of second embodiment of the present invention will be described with reference to FIG. 3.

The pull stud bolt 5 of the second embodiment differs from the pull stud bolt 1 of the first embodiment in the number of pairs of wrench engaging faces and the angle between the adjacent wrench engaging faces.

Figure 3:
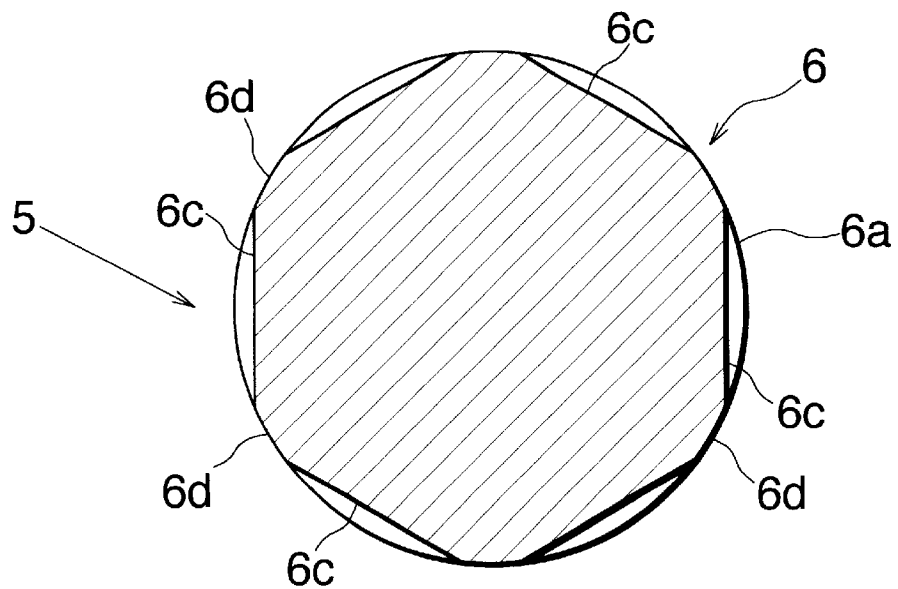
FIG. 3 is a view corresponding to FIG. 2 and showing another pull stud bolt as a second embodiment of the invention.
Figure 4:
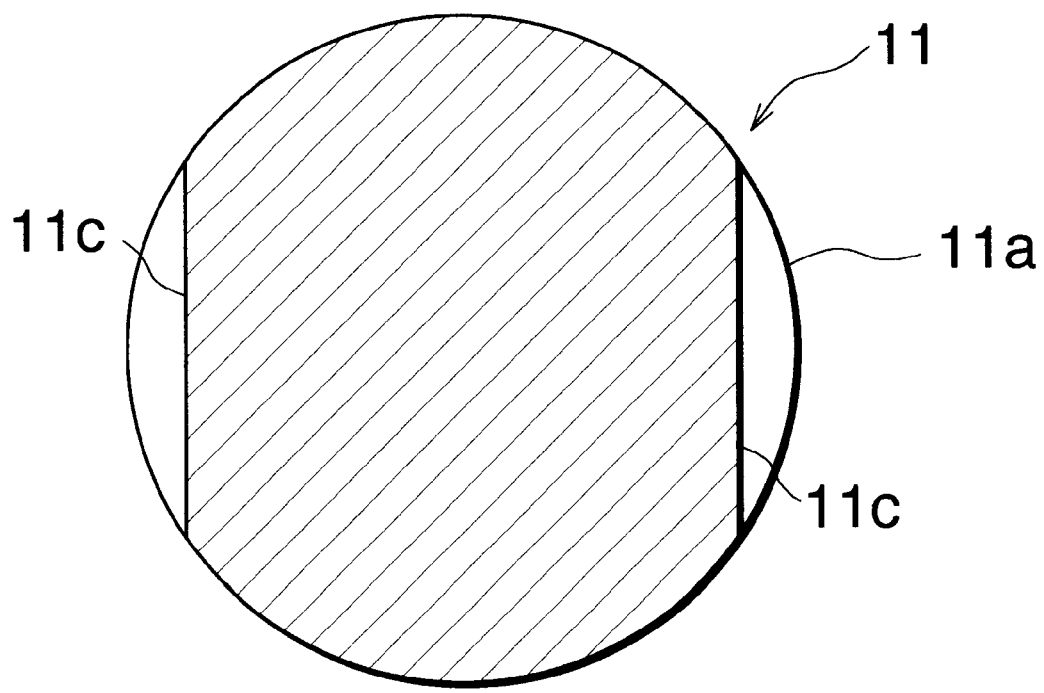
FIG. 4 is a section of a conventional pull stud bolt.

As shown in FIG. 3, a flange portion 6 has a circular part 6a toward the screw portion 2, and three pairs of wrench engaging faces 6c formed on the other part of the portion 6 toward the grip portion 4 and positioned at opposite sides of circular-arc parts 6d flush with the periphery of the circular part 6a. The adjacent wrench engaging faces 6c make an angle of 120 deg with each other. The circular-arc part 6d flush with the periphery of the circular part 6a is positioned between each pair of adjacent wrench engaging faces 6c.

The pull stud bolt 5 is handled, e.g., tightened up on a shank, by the procedure to be described below.

For example, a wrench is first fitted to the wrench engaging faces 6c of the pull stud bolt 5 with its handle positioned horizontally. The wrench is then turned through 60 deg to position the handle rearwardly obliquely upward. The wrench with its handle in the rearwardly obliquely upward position is thereafter released from the wrench engaging faces 6c. The pull stud bolt 5 is tightened up by repeating this procedure.

In the case where the width between the two opposed wrench engaging faces of the conventional pull stud bolt is equal to the width between the two opposed wrench engaging faces 3c or 6c of the pull stud bolt 1 or 5 of the present invention, the peripheral part of the flange portion of the stud bolt 1 or 5 where the wrench engaging faces 3c or 6c are formed is smaller in area than the corresponding portion of the conventional pull stud bolt where the wrench engaging faces are formed. Accordingly, the pull stud bolt of the invention has the advantage of being smaller in weight to provide a tooling of reduced weight. Further the flange portion 6 is balanced better about its axis of rotation when having the wrench engaging faces 3c of 6c of the stud bolt of the invention than when having the wrench engaging faces of the conventional stud bolt, so that the pull stud bolt 1 or 5 of the invention is smaller than the conventional pull stud bolt in vibration during high-speed rotation.

What is claimed is:

1. In a pull stud bolt comprising a male screw portion toward a first end of the pull stud bolt, to be screwed into a female portion of a shank or a tool holder for containing a selected machining bit, a grip portion at an opposite end of the pull stud bolt, and a flange portion formed between the screw portion and the grip portion, the improvement wherein:

the flange portion comprises a circular part adjacent the wrench-engaging faces; and the flange comprises two pairs of wrench engaging faces, the adjacent wrench engaging faces making an angle of 90 degrees with each other;

whereby the stud bolt is balanced for low vibration during a high-speed rotation.

2. In a pull stud bolt comprising a male screw portion toward a first end of the pull stud bolt, to be screwed into a female portion of a shank or a tool holder for containing a selected machining bit, a grip portion at an opposite end of the pull stud bolt, and a flange portion formed between the screw portion and the grip portion, the improvement wherein:

the flange portion comprises a circular part adjacent the wrench-engaging faces; and the flange comprises three pairs of wrench engaging faces, the adjacent wrench engaging faces making an angle of 120 degrees with each other;

whereby the stud bolt is balanced for low vibration during a high-speed rotation.

\* \* \* \* \*